United States Patent [19]

Hashimoto

[11] Patent Number: 5,424,342
[45] Date of Patent: Jun. 13, 1995

[54] MODIFIED VINYL CHLORIDE RESIN COMPOSITIONS

[76] Inventor: Kazuo Hashimoto, 25, Kamiyobe, Yobe-ku Himeji-city, Hyogo 671-12, Japan

[21] Appl. No.: 91,480

[22] Filed: Jul. 15, 1993

Related U.S. Application Data

[60] Continuation of Ser. No. 924,796, Aug. 6, 1992, abandoned, which is a continuation of Ser. No. 505,505, Apr. 6, 1990, abandoned, which is a continuation of Ser. No. 155,821, Feb. 16, 1988, abandoned, which is a division of Ser. No. 912,244, Aug. 27, 1986, abandoned.

[30] Foreign Application Priority Data

Dec. 31, 1984 [JP] Japan .................. 59-279623

[51] Int. Cl.6 ............................. C08L 89/00
[52] U.S. Cl. ........................... 524/22; 524/23; 524/297; 524/569
[58] Field of Search ............. 524/22, 23, 297, 569

[56] References Cited

U.S. PATENT DOCUMENTS 4,343,727  8/1982  Cohen ..................... 524/41

FOREIGN PATENT DOCUMENTS 46-037412  11/1971  Japan .
WO86/4074  7/1986  WIPO ..................... 524/23

OTHER PUBLICATIONS

Concise Encyclopedia of Chemical Technology, 1985; John Wiley & Sons; pp. 554–555.
Condenced Chemical Dictionary, Ninth Edition; Van Nostrand Reinhold Co.; 1977; p. 408.

Primary Examiner—John C. Bleutge
Assistant Examiner—Mark D. Sweet
Attorney, Agent, or Firm—Birch, Stewart, Kolasch & Birch

[57] ABSTRACT

A modified vinyl chloride resin composition prepared by adding 1 to 10 parts by dry weight of glue or gelatin to 100 parts by weight of vinyl chloride resin compound shows improved physical properties such as improved cracking resistance when used as the sole of shoes, improved adhesion properties for leather, cold cracking resistance as electric wirecoating material, improved vibration damping properties as vibration-preventing member, and non-slipping properties as power-carrying belt material, and is useful as molding composition for making footwear, coating composition with good cold resistance, belt composition with non-slipping properties, and resin material for preventing vibration having excellent vibration-damping properties.

4 Claims, 1 Drawing Sheet

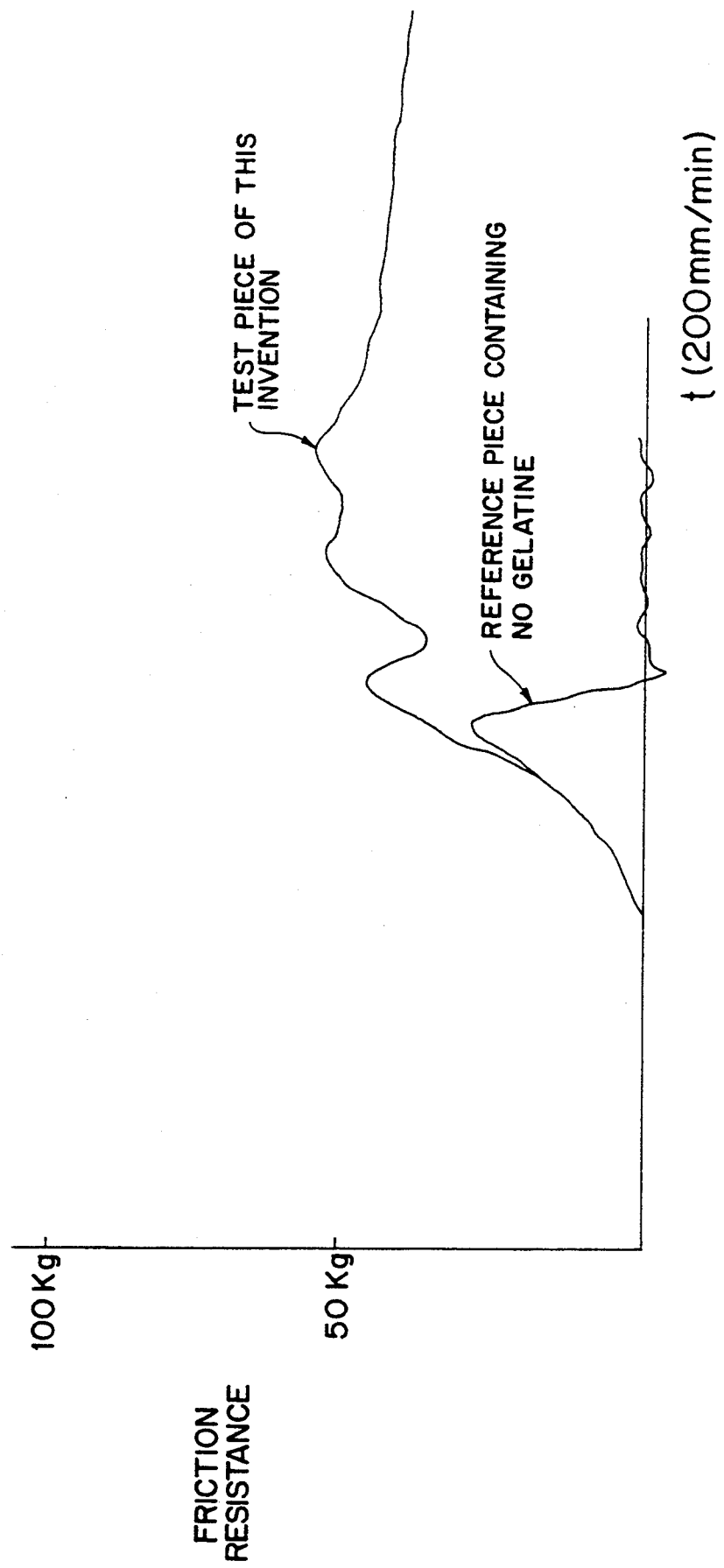

MODIFIED VINYL CHLORIDE RESIN COMPOSITIONS

This application is a continuation, of application Ser. No. 07/924,796, filed on Aug. 6, 1992, now abandoned, which is a continuation of application Ser. No. 07/505,505, filed on Apr. 6, 1990, now abandoned, which is a continuation-in-part of application Ser. No. 07/155,821, filed on Feb. 16, 1988, now abandoned which is a divisional of application Ser. No. 06/912,244, filed on Aug. 27, 1986, now abandoned

FIELD OF THE INVENTION

This invention relates to a modified vinyl chloride resin composition for use as shoe soles and any other resin products used as a substitute for natural leather.

PRIOR ART AND ITS PROBLEMS

In order to improve the physical properties or qualities of manufacturing synthetic resins, it is essential to improve qualities of the resin itself. At the same time, however, it is also necessary to develop additives which not only add new desirable qualities to manufacturing but also heightens the qualities of the resin itself.

But, development of additives is impossible without good knowledge of the qualities of both the resin, itself, and the manufacture, so development of additives tends to be delayed, In addition, there is a certain limit on the improvement of the physical properties or qualities by use of additives.

In particular, a vinyl chloride resin is excellent in that it is cheap, durable and recyclable, while it has some defects: for example, when used as a material for soles, it often cracks, is slippery and inferior in adhesion to leather; as a material for cable covering, it lacks resistance to cold and cracking; as a damping material, it has a poor damping factor; as a material for driving belts, it lacks in non-slip quality.

In recent years, therefore, various kinds of resin have been developed to make up for these defects, but they are generally expensive.

On the other hand, glue or gelatin, by products of the leather industry, is limited in its use, and has almost been replaced by synthetic adhesives. As a result, its production has been decreasing, There have been, of course, some techniques developed to make use of glue or gelatin. Some of these are as follows; a technique whereby to improve permeability of natural or synthetic rubber by mixing 20 to 100 parts of glue or gelatin with 100 parts of rubber (Japan Patent Publication No. 7412/1971, by Shows Rubber Co., Ltd, ); a technique whereby to make use of a water solution of glue as a binder when basic materials such as synthetic resin powder, clay, calcium carbonate powder and wood particles are mixed and moulded (Japan Patent Publication No. 8367/1972, by Kazuo Shinkai); a technique whereby to produce permeable medical manufactures like bandages by mixing derived protein with a polyurethane resin (Japan Patent Publication No. 87153/1983, by Seton company ). But glue or gelatin cannot be easily mixed with synthetic resins in general, so it has been believed its use as a modifier for synthetic resins is limited.

OBJECT OF THE INVENTION

An object of this invention is to remove the above mentioned defects and make wider use of vinyl chloride resins which are cheap and excellent in durability and recyclability.

Another object of this invention is to provide a modified vinyl chloride resin composition for use as shoe soles and any other resin products, for example a substitute for natural leather,

DESCRIPTION OF THE INVENTION

This invention consists of a vinyl resin composition wherein 100 parts by weight (hereafter referred only to "part" or "parts") of a vinyl chloride resin compound is homogeneously mixed with 1 to 10 parts by dry weight of glue or gelatin made from animal skin in a selected form from the group which comprises a gel form gelatin containing water and/or plasticizer and a gelatin powder finer than 100 $\mu$.

The inventive composition has such modified qualities, of the vinyl chloride resin, as adhesion to natural materials, wear-resistance, cold-resistance and so on.

Therefore, if a certain amount of glue or gelatin is mixed up homogeneously with a vinyl chloride resin compound for use as soles, the resultant composition has excellent non-slip quality.

Or, if a certain amount of glue or gelatin is mixed up homogeneously with a vinyl chloride resin compound for synthetic leather, the resultant composition has excellent cold-resistance quality and is useful as a seat covering material.

Again, when a certain amount of glue or gelatin is mixed up homogeneously with a vinyl chloride resin compound for belting, the resultant composition has excellent non-slip quality and is useful as a belting material.

And when glue or gelatin is mixed up homogeneously with a resin compound for use as a damping material, the resultant composition has superb damping qualities, "Glue" or "gelatin" used for this invention, is available as a by-product of the leather industry and are also readily available in the form of fine powder smaller than 100 $\mu$ or gel form gelatin for industrial use. The gel form gelatin, which is called "industrial gelatin" in Japan, can be easily mixed and worked up with vinyl chloride resin without special treatment. In addition, it is available at low cost, so it is ideal for the purpose of improving the qualities of vinyl chloride resins, which are also available at low cost. On the other hand, the fine powder can also be easily mixed and worked up with vinyl chloride resin without special treatment. Especially, it is preferred to use a fine powder with a molecular weight of smaller than 20,000.

The amount of glue or gelatin to be mixed with vinyl chloride resin compounds may depend on the composition and the modified purpose of the compound. Usually the improved effects become apparent when 1 part of glue or gelatin is added to 100 parts of vinyl chloride resin compound. But when the amount of glue or gelatin exceeds 10 parts, it shows no further improving effects but has undesirable effects on physical qualities of the vinyl chloride resin compound, therefore the maximum amount to be mixed should be no more than 10 parts.

"Vinyl chloride resin compound" in this specification can be selected from among various kinds available. It usually contains plasticizers, stabilizers, fillers and pigments, In this invention, a preferred compound may contain 100 parts of vinyl chloride resin with the (degree of polymerization decided by the use for which the compound is intended; for example, as a material for soles, more than 1600 is preferable), 80 up to 100 parts of plasticizer and proper amount of foaming agent, stabilizer and pigment.

The modified resin composition is usually produced through the process of melting and mixing of material, cooling and injection molding. More definatively, vinyl chloride resin, plasticizer and a solution or gel of glue or gelatin are mixed in a mixer under a temperature of 70°–120° C.; then stabilizer and filler are added and aged under heat so that all the ingredients can be Homogeneously mixed. For achievement of much more homogeneously mixing, it is preferred to premix the gel form gelatin with plasticizer and form a prospective collidal mixture of them before it is mixed with the vinyl chloride resin. It is also preferred to use the fine powder gelatin with a molecular weight of smaller than 20,000 instead of the gel form gelatin because the fine powder gelatin is water-soluble and thus can be mixed homogeneously with ease.

BRIEF EXPLANATION OF THE FIGURE

FIG. 1 is a chart which shows the result of slip test wherein comparison is made between a test piece of the modified vinyl chloride resin compound of this invention and a reference piece which contains no glue or gelatin.

BEST COMPOSITION OF THE INGREDIENTS AND PROCESS FOR THE INVENTION I

EXAMPLE b 1)

| | |
|---|---|
| Vinyl Chloride Resin (degree of polymerization more than 1600) | 100 parts |
| Plasticizer (DOP, DOA, D-160) | 80 parts |
| Stabilizer (Ba—Zn) | 3 parts |
| Filler (CaCO3) | 15 parts |
| (Allowable Error ±10% for each ingredient above) | |
| Industrial Gelatin (containing 50% of water by weight) | 5-15 parts |

Process of Manufacture

Vinyl chloride resin, plasticizer, industrial gelatin are blended in the mixer under the temperature of about 80° C., and then stabilizer and filler are added. The mixture is aged until water has evaporated. After cooling, resin composition was made by injection moulding into a sole by any ordinary process.

(EXAMPLE 2)

| | |
|---|---|
| Vinyl Chloride Resin (degree of polymerization more than 1600) | 100 parts |
| Plasticizer (DOP, DOA, D-160) | 65 parts |
| Stabilizer (Ba—Zn) | 3 parts |
| Filler (CaCO3) | 15 parts |
| (Allowable Error ±10% for each ingredient above) | |
| Gel form gelatin mixture | 30 parts |

Process of Manufacture

Plasticizer 15 parts and industrial gelatin 15 parts are mixed to make a prospective collidal mixture and the gel form gelatin mixture, vinyl chloride resin and plasticizer are blended in the mixer under the temperature of about 80° C., and then stabilizer and filler are added. The mixture is aged until water has evaporated. After cooling, resin composition was made by injection moulding into a sole by any ordinary process.

(EXAMPLE 3)

| | |
|---|---|
| Vinyl Chloride Resin (degree of polymerization more than 1600) | 100 parts |
| Plasticizer (DOP, DOA, D-160) | 80 parts |
| Stabilizer (Ba—Zn) | 3 parts |
| Filler (CaCO3) | 15 parts |
| (Allowable Error ±10% for each ingredient above) | |
| Fine powder gelatin | 15 parts |

Process of Manufacture

Fine powder gelatin is prepared by the process disclosed in our Japanese patent application No. 10397/1989 filed on Apr. 28, 1989.

An aqueous solution of gelatin (containing about 75% of water) is prepared and subjected to a proteolysis treatment by a proteolytic enzyme (BIOPLAZE from NAGASE biochemical industry INC. in Japan). After the treatment, there is provided a water soluble gelatin with average molecular weight of about 5700. An filtrate of the treated aqueous solution is dried on a surface of heated roller to give a crude gelatin powder, The gelatin powder is subjected to a milling treatment by means of a ultrasonic Jet mill of IDS type (made by NIHON NEWMATIC INDUSTRY INC. in Japan) to give a fine milled powder of 100 micron or less, The fine powder gelatin, vinyl chloride resin and plasticizer are blended in the mixer under the temperature of about 80° C., and then stabilizer and filler are added. After cooling, resin composition was made by injection moulding into a sole by any ordinary process, Result of Slip Test O-Y Pull-Slipmeter. (slip testing machine made by Hiromoto Industrial Machinery Co., Osaka, Japan) is used to show the changes of friction drag against pulling under a given load: two pieces of the same size are used for the test; one is a test piece made of the modified vinyl chloride resin composition containing 10 parts of industrial gelatin; the other is a reference piece made of a vinyl chloride resin compound containing no gelatin.

The result is shown in FIG. 1: the test piece of the modified resin composition of this invention has high friction resistance (57 kg maximum), and its friction resistance has durability; on the other hand, the friction resistance of the reference is comparatively low and without durability. Therefore, it is noticed that the invention resin composition for use as a sole has excellent non-slip quality.

Result of Bend Test

Bend test is made in the ordinary way for the sole made from the above mentioned modified resin composition under a temperature of −30° C. The sole of this modified resin composition was not cracked after 10,000 times of bending, which shows that it has excellent elasticity.

Improvement of Cold-Resistance

Cold-resistance test is given for a cable covering made of the modified vinyl chloride resin composition which is composed of 100 parts by weight of vinyl chloride resin compound and 1, 2.5, 5, 5, 7.5 or 10 parts by dry weight of industrial gelatin (containing 50% of water by weight). The result is given below:

| | |
|---|---|
| Method for the Test | JIS (Japan Industrial Standard) K |
| Test Piece | containing 5.0 parts of industrial gelatin |

-continued

| Reference | containig no glue or gelatin | |
|---|---|---|
| Cold-Resistance (°C.) | Test Piece | Reference |
| F. 0 | −40 | −15 |
| F. 50 | −42.5 | −22.5 |
| F. 100 | −45 | −30 |

Improvement of Other Qualities

Through the process of this invention, glue or gelatin provides through homogeneousness in the matrix of the compound, Therefore, the following improvement effects are observed.

Improvement of Adhesion

The modified composition of this invention has better adhesion to cow skin than other similar composition. For example, it is found that the sole made from this composition needs no sewing when adhered to cow skin and does not come off under normal condition of use. Therefore, according to this invention, vinyl chloride resin which is cheap and recyclable, can be improved in the adhesion quality, so that this composition is very useful for sole materials in practice, Improvement of Non-Slip Quality The modified resin composition of this invention has far better non-slip quality than synthetic rubber compounds. It is, therefore, a useful material not only for soles but also for driving belts which require excellent non-slip quality.

Improvement of Outlook and Texture

The modified resin composition has better and finer outlook and texture than any other similar one and also admits of finer coloration of pigments. It has gloss without any special treatment such as coating or painting.

Improvement of Oilproof

The improved composition of this invention had stronger resistance to oil than any other similar composition.

Improvement of Wear-resistance

The modified resin composition of this invention wears more than other compound of similar kind, which gives more natural leatherlike quality.

improvement of Humidity-Absorption

The modified resin composition of this invention is more humidity-absorbent than any other compound of similar kind, which gives more natural leatherlike quality.

Improvement of Damping Factor

When this improved composition is compared with any other composition of similar kind containing no glue or gelatin in terms of damping factor, the former is far more excellent as a damping material, due to addition of glue or gelatin.

Improvement of Cold-Resistance

The modified resin composition of this invention shows excellent resistance to cracking under the extreme cold of −30° C. It is, therefore, a suitable material for cable coverings which are often used under extremely cold conditions.

Possible Utility in Industry

This invention, making use of glue or gelatin which has so far had very limited use as an additive to synthetic resin, can improve various qualities of vinyl chloride resin which, in spite of its cheapness, durability and recyclability, has some defects: this invention can improve non-slip quality and resistance to bending of vinyl chloride resin, so it is useful for sole and belting; it is useful for seat covering, because can improve cold resistance of vinyl chloride resin; it is useful as a damping material because it can improve damping factor of vinyl chloride resin. Thus this invention has great values and possibilities in the field of industry.

I claim:

1. A modified vinyl chloride resin composition for use as shoe soles and any other resin products, which comprises 100 parts by weight of a vinyl chloride resin compound and 1–10 parts by dry weight of a gelatin compound, wherein the gelatin compound is a prospective colloid mixture which is made of a gel form gelatin containing a plasticizer selected from the group consisting of dioctyl adipate (DOA), dioctyl phthalate (DOP), a mixtures thereof.

2. The modified vinyl chloride resin composition according to claim 1 wherein the vinyl chloride resin and gelatin are in a homogeneous mixture.

3. The modified vinyl chloride resin composition according to claim 1 wherein the vinyl chloride resin contains a plasticizer, a foaming agent, a stabilizer and a pigment.

4. The modified vinyl chloride resin composition of claim 1 wherein the vinyl chloride resin compound has a degree of polymerization of more than 1600.

* * * * *